United States Patent

Romanak et al.

[11] Patent Number: 6,055,942
[45] Date of Patent: May 2, 2000

[54] ILLUMINATED ANIMAL COLLAR

[76] Inventors: Joseph Romanak; Margaret Romanak, both of 3511 E. Ruth Ellen La., Oak Creek, Wis. 53154-4142

[21] Appl. No.: 09/209,808

[22] Filed: Dec. 11, 1998

[51] Int. Cl.[7] .................................................. A01K 27/00
[52] U.S. Cl. ............................................................ 119/859
[58] Field of Search ...................................... 119/859, 863

[56] References Cited

U.S. PATENT DOCUMENTS 3,944,803  3/1976  Chao ...................................... 119/859 X
5,370,082  12/1994  Wade ....................................... 119/859
5,950,571  9/1999  Schade ..................................... 119/859

*Primary Examiner*—Robert P. Swiatek

[57] ABSTRACT

An illuminated animal collar including a base strip adapted for being removably attached to a neck of an animal such as a dog. A battery is coupled to the base strip and a plurality of lights are mounted along the base strip and adapted to illuminate upon the actuation thereof. A flasher is connected between the battery and the lights for intermittently actuating the lights upon the receipt of power from the battery, thereby rendering the animal more visible in the absence of ambient light.

7 Claims, 3 Drawing Sheets

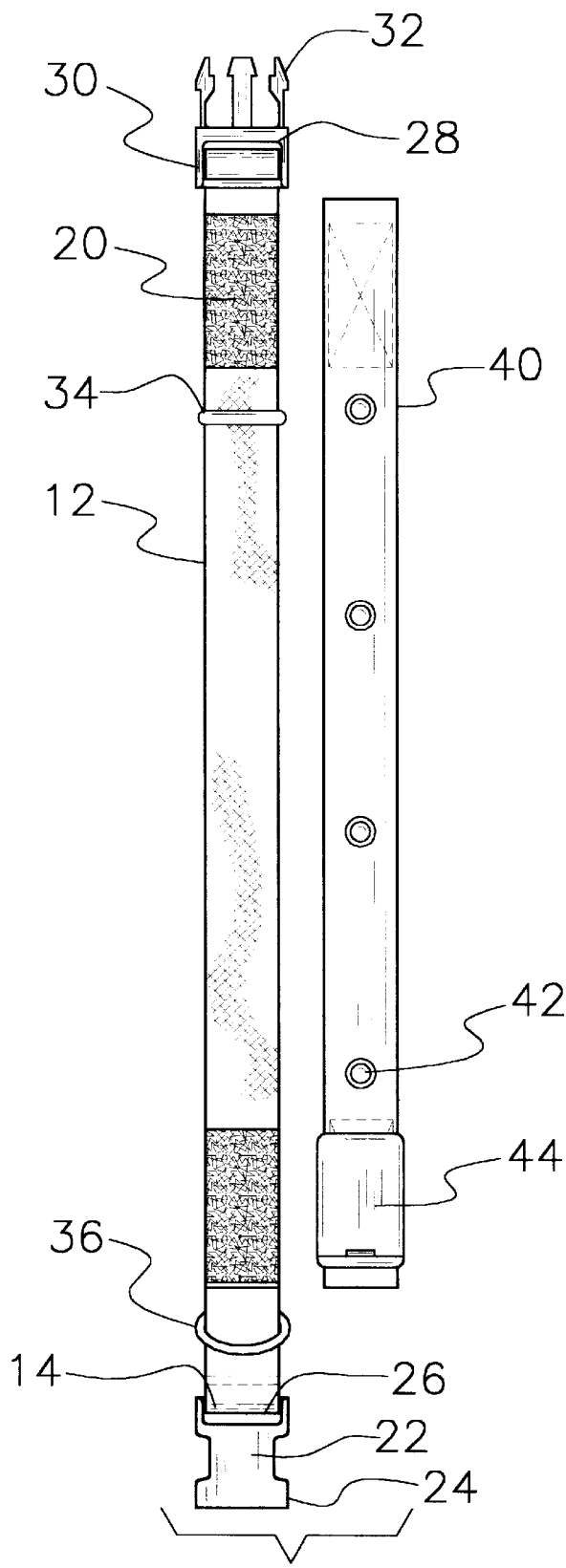
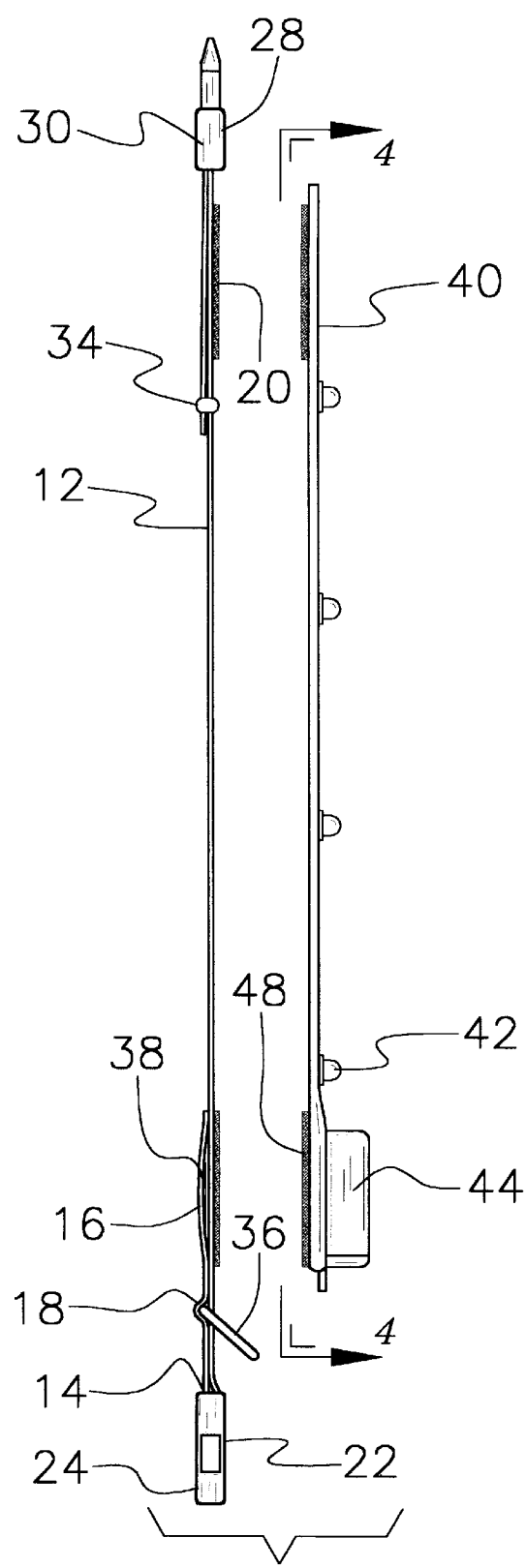

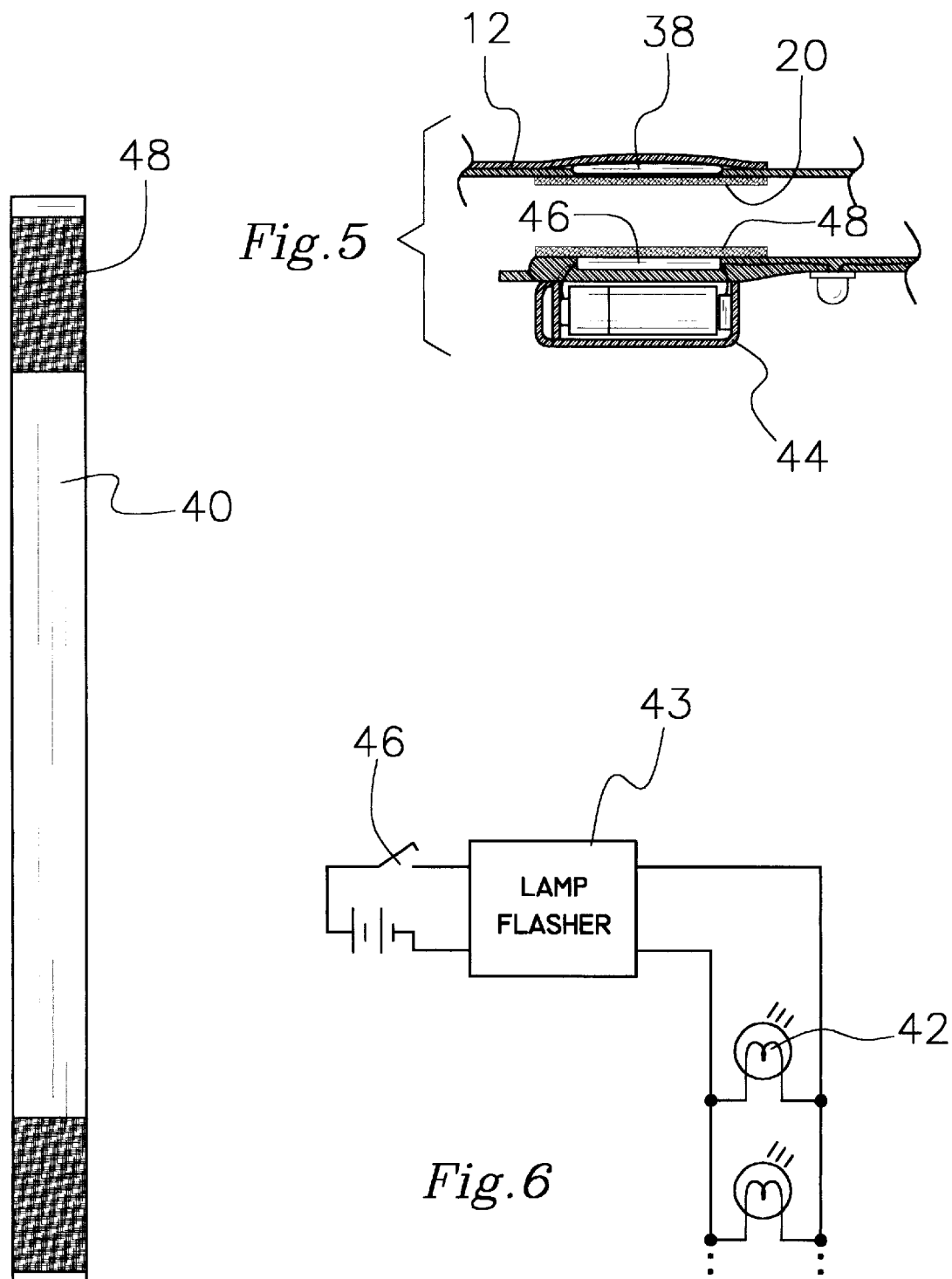

ILLUMINATED ANIMAL COLLAR

BACKGROUND OF THE INVENTION

1. Field of the Invention

The present invention relates to dog collars and more particularly pertains to a new illuminated animal collar for rendering an animal such as a dog more visible in the absence of ambient light.

2. Description of the Prior Art

The use of dog collars is known in the prior art. More specifically, dog collars heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,173,201; U.S. Pat. No. 4,895,110; U.S. Pat. No. 2,721,257; U.S. Pat. No. 4,909,189; U.S. Pat. No. 3,134,548; and U.S. Pat. Des. 379,252.

In these respects, the illuminated animal collar according to the present invention substantially departs from the conventional concepts and designs of the prior art, and in so doing provides an apparatus primarily developed for the purpose of rendering an animal such as a dog more visible in the absence of ambient light.

SUMMARY OF THE INVENTION

In view of the foregoing disadvantages inherent in the known types of dog collars now present in the prior art, the present invention provides a new illuminated animal collar construction wherein the same can be utilized for rendering an animal such as a dog more visible in the absence of ambient light.

The general purpose of the present invention, which will be described subsequently in greater detail, is to provide a new illuminated animal collar apparatus and method which has many of the advantages of the dog collars mentioned heretofore and many novel features that result in a new illuminated animal collar which is not anticipated, rendered obvious, suggested, or even implied by any of the prior art dog collars, either alone or in any combination thereof.

To attain this, the present invention generally comprises a base strip constructed from a flexible inelastic material having a substantially planar rectangular configuration. The base strip is equipped with a top face, a bottom face, and a periphery formed therebetween. As shown in FIG. 3, the base strip further has a first end folded over the bottom face of the base strip and stitched thereto. Such stitching is configured for defining an outboard laterally extending sleeve, a completely enclosed inboard compartment, and an intermediate laterally extending sleeve. As shown in FIG. 2, a pair of fasteners are provided each with a width equal to that of the base strip and a length about ⅛ that of the base strip. Such fasteners are mounted on the top face of the base strip adjacent to and spaced from opposite ends thereof. Next provided is a female couple including a thin substantially rectangular box having an open outboard end and a pair of side openings. An inboard rod is positioned on the female couple for being secured within the outboard laterally extending sleeve of the base strip. Associated therewith is a male couple with a buckle selectively secured along a second end of the base strip. A pair of resilient prongs are coupled to the buckle and extend therefrom in coplanar relationship therewith for releasably engaging the female couple to secure the base strip about a neck of an animal. FIGS. 2 & 3 show an elastic band removably positioned about the second end of the base strip and a remaining portion of the base strip. In use, the elastic band is adapted for maintaining the second end of the base strip against the remaining portion thereof. With continuing reference to FIGS. 2 & 3, a rigid O-ring is secured within the intermediate laterally extending sleeve of the base strip. For reasons that will soon become apparent, a flexible generally planar rectangular magnet is mounted within the inboard compartment of the base strip. Next provided is a detachable strip constructed from a flexible inelastic material having a substantially planar rectangular configuration. The detachable strip is equipped with a top face, a bottom face, and a periphery formed therebetween which is each sized similar to that of the base strip. The detachable strip has a plurality of linearly aligned, uniquely colored and equally spaced lights mounted on the top face thereof between the ends thereof. In use, the lights are adapted to be illuminated upon the actuation thereof. Connected to the lights is a flasher for intermittently actuating the same upon the receipt of power. A battery compartment is provided including a peripheral side wall coupled to the top face of the housing and a top face for defining an interior space and an open side. Such open face is directed toward one of the ends of the detachable strip with a removable lid for securing at least one battery therein. As shown in FIG. 5, the detachable strip further includes a reed switch connected between the battery and the flasher for supplying power thereto only upon being positioned in the proximity of the magnet. As best shown in FIGS. 3 & 4, the detachable strip further includes a pair of fasteners mounted on the bottom face of the detachable strip adjacent to opposite ends thereof. In operation, the fasteners of the detachable strip serve for being releasably attached to those on the base strip. As such, the flasher is supplied power, thereby rendering the animal more visible in the absence of ambient light.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new illuminated animal collar apparatus and method which has many of the advantages of the dog collars mentioned heretofore and many novel features that result in a new illuminated animal collar which is not anticipated, rendered obvious, suggested, or even implied by any of the prior art dog collars, either alone or in any combination thereof.

It is another object of the present invention to provide a new illuminated animal collar which may be easily and efficiently manufactured and marketed.

It is a further object of the present invention to provide a new illuminated animal collar which is of a durable and reliable construction.

An even further object of the present invention is to provide a new illuminated animal collar which is susceptible of a low cost of manufacture with regard to both materials and labor, and which accordingly is then susceptible of low prices of sale to the consuming public, thereby making such illuminated animal collar economically available to the buying public.

Still yet another object of the present invention is to provide a new illuminated animal collar which provides in the apparatuses and methods of the prior art some of the advantages thereof, while simultaneously overcoming some of the disadvantages normally associated therewith.

Still another object of the present invention is to provide a new illuminated animal collar for rendering an animal such as a dog more visible in the absence of ambient light.

Even still another object of the present invention is to provide a new illuminated animal collar that includes a base strip adapted for being removably attached to a neck of an animal such as a dog. A battery is coupled to the base strip and a plurality of lights are mounted along the base strip and adapted to illuminate upon the actuation thereof. A flasher is connected between the battery and the lights for intermittently actuating the lights upon the receipt of power from the battery, thereby rendering the animal more visible in the absence of ambient light.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top exploded view of the present invention.

FIG. 3 is a side exploded view of the present invention.

FIG. 4 is a bottom view of the detachable strip of the present invention.

FIG. 5 is a cross-sectional view of the strips of the present invention.

FIG. 6 is a schematic diagram of the present invention.

DESCRIPTION OF THE PREFERRED EMBODIMENT

Figure 1:
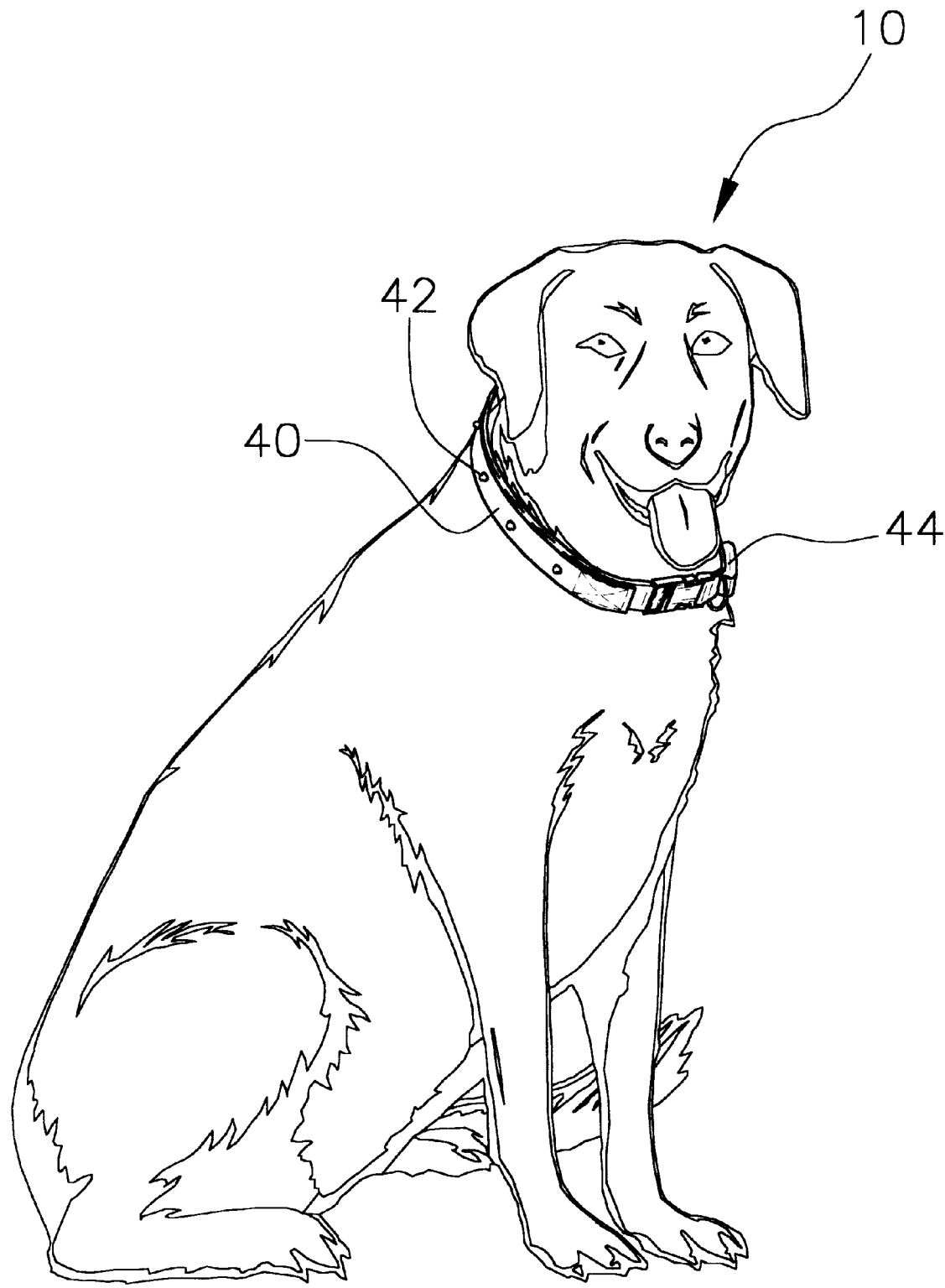
FIG. 1 is a perspective view of a new illuminated animal collar according to the present invention.

With reference now to the drawings, and in particular to FIGS. 1 through 6 thereof, a new illuminated animal collar embodying the principles and concepts of the present invention and generally designated by the reference numeral 10 will be described.

The present invention, designated as numeral 10, includes a base strip 12 constructed from a flexible inelastic material having a substantially planar rectangular configuration. The base strip is equipped with a top face, a bottom face, and a periphery formed therebetween. As shown in FIG. 3, the base strip further has a first end folded over the bottom face of the base strip and stitched thereto. Such stitching is configured for defining an outboard laterally extending sleeve 14, a completely enclosed inboard compartment 16, and an intermediate laterally extending sleeve 18.

As shown in FIG. 2, a pair of fasteners 20 are provided each with a width equal to that of the base strip and a length about ⅛ that of the base strip. Such fasteners are mounted on the top face of the base strip adjacent to and spaced from opposite ends thereof.

Next provided is a female couple 22 including a thin substantially rectangular box 24 having an open outboard end and a pair of side openings. An inboard rod 26 is positioned on the female couple for being secured within the outboard laterally extending sleeve of the base strip. Associated therewith is a male couple 28 with a buckle 30 selectively secured along a second end of the base strip. A pair of resilient prongs 32 are coupled to the buckle and extend therefrom in coplanar relationship therewith for releasably engaging the female couple to secure the base strip about a neck of an animal.

FIGS. 2 & 3 show an elastic band 34 removably positioned about the second end of the base strip and a remaining portion of the base strip. In use, the elastic band is adapted for maintaining the second end of the base strip against the remaining portion thereof. With continuing reference to FIGS. 2 & 3, a rigid O-ring 36 is secured within the intermediate laterally extending sleeve of the base strip for being attached to a leash or the like. For reasons that will soon become apparent, a flexible generally planar rectangular magnet 38 is mounted within the inboard compartment of the base strip.

Next provided is a detachable strip 40 constructed from a flexible inelastic material having a substantially planar rectangular configuration. The detachable strip is equipped with a top face, a bottom face, and a periphery formed therebetween which is each sized similar to that of the base strip. The detachable strip has four to six linearly aligned, uniquely colored and equally spaced lights 42 mounted on the top face thereof between the ends thereof. In use, the lights are connected in parallel and adapted to be illuminated upon the actuation thereof. Connected to the lights is a flasher 43 for intermittently actuating the same upon the receipt of power.

A rigid battery compartment 44 is provided including a peripheral side wall coupled to the top face of the housing and a top face for defining an interior space and an open side. Such open face is directed toward one of the ends of the detachable strip with a removable lid for securing at least one AA battery therein. As shown in FIG. 5, the detachable strip further includes a reed switch 46 is positioned within a thickened portion of the detachable portion and connected between the battery and the flasher for supplying power thereto only upon being positioned in the proximity of the magnet.

As best shown in FIGS. 3 & 4, the detachable strip further includes a pair of fasteners 48 mounted on the bottom face of the detachable strip adjacent to opposite ends thereof. It should be noted that the fasteners may comprise of any type of couple including, but not limited to adhesive, pile fasteners (VELCRO™), buttons, or the like. In operation, the fasteners of the detachable strip serve for being releasably attached to those on the base strip. As such, the flasher is supplied power, thereby rendering the animal more visible in the absence of ambient light.

As to a further discussion of the manner of usage and operation of the present invention, the same should be apparent from the above description. Accordingly, no further discussion relating to the manner of usage find operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An illuminated animal collar system comprising, in combination:

a base strip constructed from a flexible inelastic material having a substantially planar rectangular configuration with a top face, a bottom face, and a periphery formed therebetween, the base strip having a first end folded over the bottom face of the base strip and stitched thereto for defining an outboard laterally extending sleeve, a completely enclosed inboard compartment, and an intermediate laterally extending sleeve;

a pair of fasteners each with a width equal to that of the base strip and a length about ⅛ that of the base strip, the fasteners mounted on the top face of the base strip adjacent to and spaced from opposite ends thereof;

a female couple including a thin substantially rectangular box having an open outboard end and a pair of side openings and an inboard rod being secured within the outboard laterally extending sleeve of the base strip;

a male couple with a buckle selectively secured along a second end of the base strip and a pair of resilient prongs coupled to the buckle and extending therefrom in coplanar relationship therewith for releasably engaging the female couple to secure the base strip about a neck of an animal;

an elastic band removably positioned about the second end of the base strip and a remaining portion of the base strip for maintaining the second end of the base strip against the remaining portion thereof;

a rigid O-ring secured within the intermediate laterally extending sleeve of the base strip;

a flexible generally planar rectangular magnet mounted within the inboard compartment of the base strip; and a detachable strip constructed from a flexible inelastic material having a substantially planar rectangular configuration with a top face, a bottom face, and a periphery formed therebetween each sized similar to that of the base strip, the detachable strip having a plurality of linearly aligned, uniquely colored and equally spaced lights mounted on the top face thereof between the ends thereof with the lights being adapted to be illuminated upon the actuation thereof, a flasher connected to the lights and adapted to intermittently actuate the same upon the receipt of power, and a battery compartment including a peripheral side wall coupled to the top face of the housing and a top face for defining an interior space and an open side facing one of the ends of the detachable strip with a removable lid for securing at least one battery therein, the detachable strip further including a reed switch connected between the battery and the flasher for supplying power thereto only upon being positioned in the proximity of the magnet, the detachable strip further including a pair of fasteners mounted on the bottom face of the detachable strip adjacent to opposite ends thereof for being releasably attached to those on the base strip, whereby the flasher is supplied power, thereby rendering the animal more visible in the absence of ambient light.

2. An illuminated animal collar as set forth in claim 1 wherein the lights are linearly aligned along a length of the auxiliary strip.

3. An illuminated animal collar comprising:

a base strip adapted for being removably attached to a neck of an animal;

a battery coupled to the base strip;

a plurality of lights coupled along the base strip and adapted to illuminate upon the actuation thereof; and a flasher connected between the battery and the lights for intermittently actuating the lights upon the receipt of power from the battery, thereby rendering the animal more visible in the absence of ambient light; and wherein the lights, battery and flasher are mounted on an auxiliary strip which is removably coupled to the base strip, wherein a reed switch is connected between the flasher and the battery and a magnet is mounted on the base strip such that the flasher is supplied with power when coupled to the base strip.

4. An illuminated animal collar as set forth in claim 3 wherein the base strip is mounted to the animal via a male couple and a female couple.

5. An illuminated animal collar comprising:

a base strip adapted for being removably attached to a neck of an animal;

a battery coupled to the base strip;

a plurality of lights mounted on the base strip and adapted to illuminate upon the actuation thereof; and a flasher connected between the battery and the lights for intermittently actuating the lights upon the receipt of power from the battery, thereby rendering the animal more visible in the absence of ambient light; and wherein the lights, battery and flasher are mounted on an auxiliary strip which is removably coupled to the base strip, wherein a reed switch is connected between the flasher and the battery on the auxiliary strip, and a magnet is mounted on the base strip such that the reed switch is located adjacent to the magnet when the auxiliary strip is coupled to the base strip and the flasher is supplied with power when coupled to the base strip.

6. An illuminated animal collar as set forth in claim 5 wherein the lights are linearly aligned along a length of the auxiliary strip.

7. An illuminated animal collar as set forth in claim 5 wherein the base strip is mounted to the animal via a male couple and a female couple.

\* \* \* \* \*